US012216882B2

(12) United States Patent
Bozovich, Jr.

(10) Patent No.: US 12,216,882 B2
(45) Date of Patent: Feb. 4, 2025

(54) APPLICATION DATA DISPLAYED THROUGH A SELECTABLE APPLICATION ICON

(71) Applicant: PAYPAL, INC., San Jose, CA (US)

(72) Inventor: David Paul Bozovich, Jr., San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/357,907

(22) Filed: Jul. 24, 2023

(65) Prior Publication Data

US 2024/0192826 A1 Jun. 13, 2024

Related U.S. Application Data

(63) Continuation of application No. 17/865,514, filed on Jul. 15, 2022, now Pat. No. 11,747,957, which is a continuation of application No. 17/013,071, filed on Sep. 4, 2020, now Pat. No. 11,392,266, which is a continuation of application No. 16/121,435, filed on Sep. 4, 2018, now Pat. No. 10,768,781, which is a continuation of application No. 14/968,730, filed on Dec. 14, 2015, now Pat. No. 10,067,637.

(51) Int. Cl.
| | |
|---|---|
| *G06F 3/04817* | (2022.01) |
| *G06F 3/0482* | (2013.01) |
| *G06F 3/0484* | (2022.01) |
| *G06F 3/04842* | (2022.01) |

(52) U.S. Cl.
CPC ........ *G06F 3/04817* (2013.01); *G06F 3/0482* (2013.01); *G06F 3/0484* (2013.01); *G06F 3/04842* (2013.01)

(58) Field of Classification Search
CPC .. G06F 3/04817; G06F 3/0484; G06F 3/0482; G06F 3/04842
See application file for complete search history.

(56) References Cited

U.S. PATENT DOCUMENTS

| | | | |
|---|---|---|---|
| 2007/0265951 A1 | 11/2007 | Hagerman et al. | |
| 2009/0254440 A1 | 10/2009 | Pharris | |
| 2009/0305732 A1* | 12/2009 | Marcellino | H04L 67/60 455/466 |
| 2013/0124321 A1 | 5/2013 | Yamane et al. | |

(Continued)

*Primary Examiner* — Andrey Belousov
(74) *Attorney, Agent, or Firm* — Haynes and Boone, LLP

(57) ABSTRACT

There are provided systems and methods for application data displayed through a selectable application icon. A computing device, such as a mobile smart phone, may include one or more processing application, such as a payment application to utilize an online payment provider. The application may include a desktop or folder icon, or other visual icon that may be presented within an interface of the device's operating system. Additionally, the application may include application data normally presented to the user of the device during operation of the application. The application or the device's operating system may select an informational element of the application information to present to the user. The informational element may then be presented on the application icon while the application is unopened or executing in the background of the operating system. Multiple informational elements may be cycled through on the application icon.

20 Claims, 6 Drawing Sheets

(56) References Cited

U.S. PATENT DOCUMENTS

2014/0068516 A1* 3/2014 Escobedo ............ G06F 3/0482
715/835
2016/0253702 A1* 9/2016 Gonzales, Jr. ..... G06Q 30/0261
705/14.48

* cited by examiner

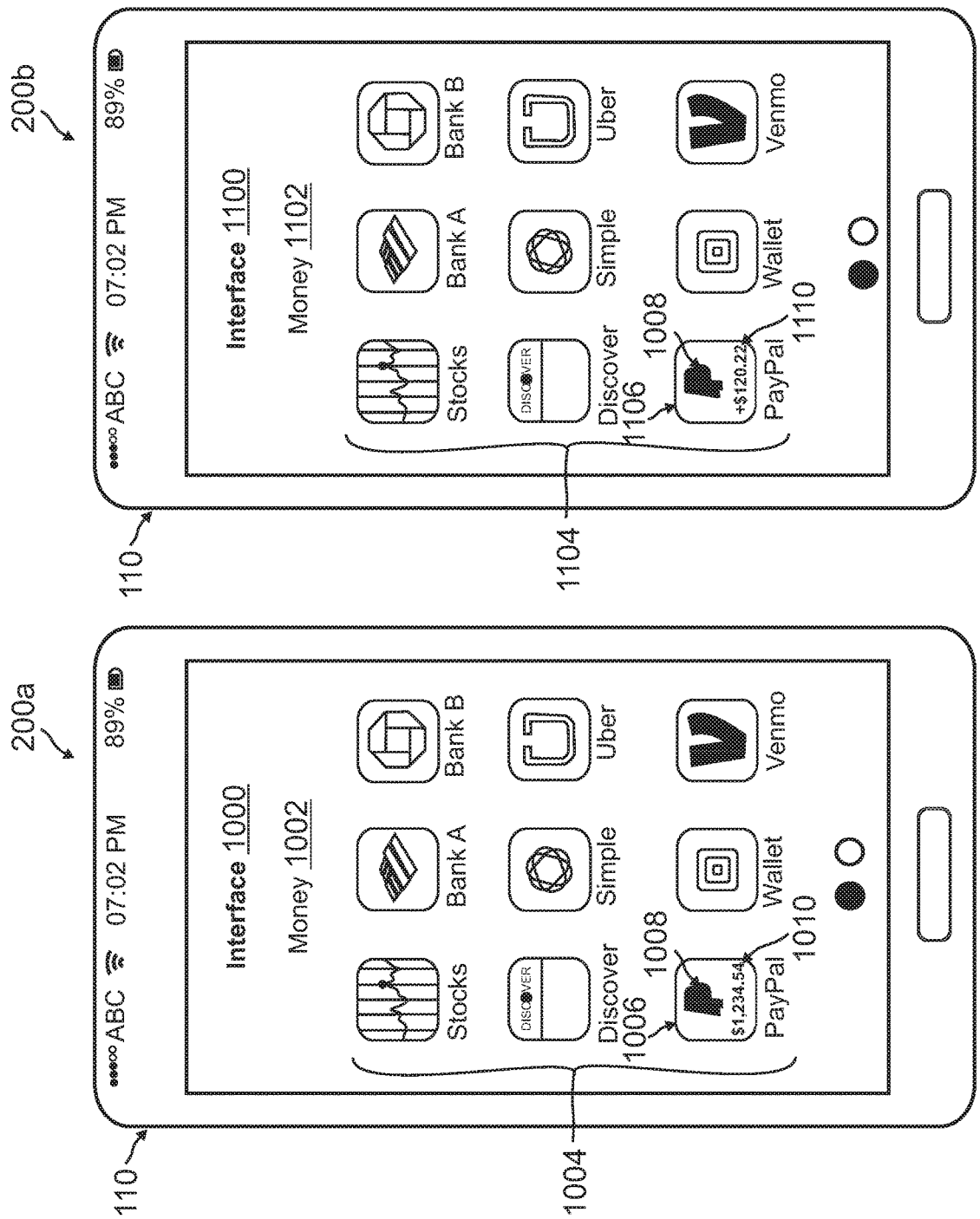

APPLICATION DATA DISPLAYED THROUGH A SELECTABLE APPLICATION ICON

CROSS REFERENCE TO RELATED APPLICATIONS

This application is a continuation of U.S. patent application Ser. No. 17/865,514 filed on Jul. 15, 2022, which is a continuation of U.S. patent application Ser. No. 17/013,071 filed on Sep. 4, 2020, now U.S. Pat. No. 11,392,266, which is a continuation of U.S. patent application Ser. No. 16/121,435 filed on Sep. 4, 2018, now U.S. Pat. No. 10,768,781, which is a continuation of U.S. patent application Ser. No. 14/968,730 filed on Dec. 14, 2015, now U.S. Pat. No. 10,067,637, the content of which are hereby incorporated by reference in their entirety for all purposes.

TECHNICAL FIELD

The present application generally relates to application icons and user interfaces, and more specifically to application data displayed through a selectable application icon.

BACKGROUND

Computing devices may provide applications to users, which may allow the users to execute certain processes and engage in various functionalities of the computing device. With the rise in mobile computing devices (e.g., mobile smart phones, tablet computers, etc.), users utilize more and more specific dedicated applications for processes and functions. For example, a payment application may allow the users to provide mobile and/or digital payments. These payment applications may also include additional financial services, such as account balance updates, transaction review and dispute resolution, and credit history checks. The payment applications may interface with physical, real-world merchants nearby the user to allow the user to pay for transactions and purchase items. Other popular applications may include messaging, email, social networking, and additional communication applications. Moreover, the merchants may provide their own dedicated application to alert the user of sales and entice business. However, often such information is only presented when the application is open and visibly displayed on a display device of the computing device. For example, the information may be presented through an interface of the application currently on display. Thus, if the user views the application icon when the application is closed or executing in the background of the device's operating system, the user may be unaware of valuable information associated with the application.

BRIEF DESCRIPTION OF THE DRAWINGS

FIG. 2A is an exemplary computing device interface having a customized application icon presenting application information, according to an embodiment;

FIG. 2B is an exemplary computing device interface having a customized application icon presenting application information, according to an embodiment;

Figure 1:
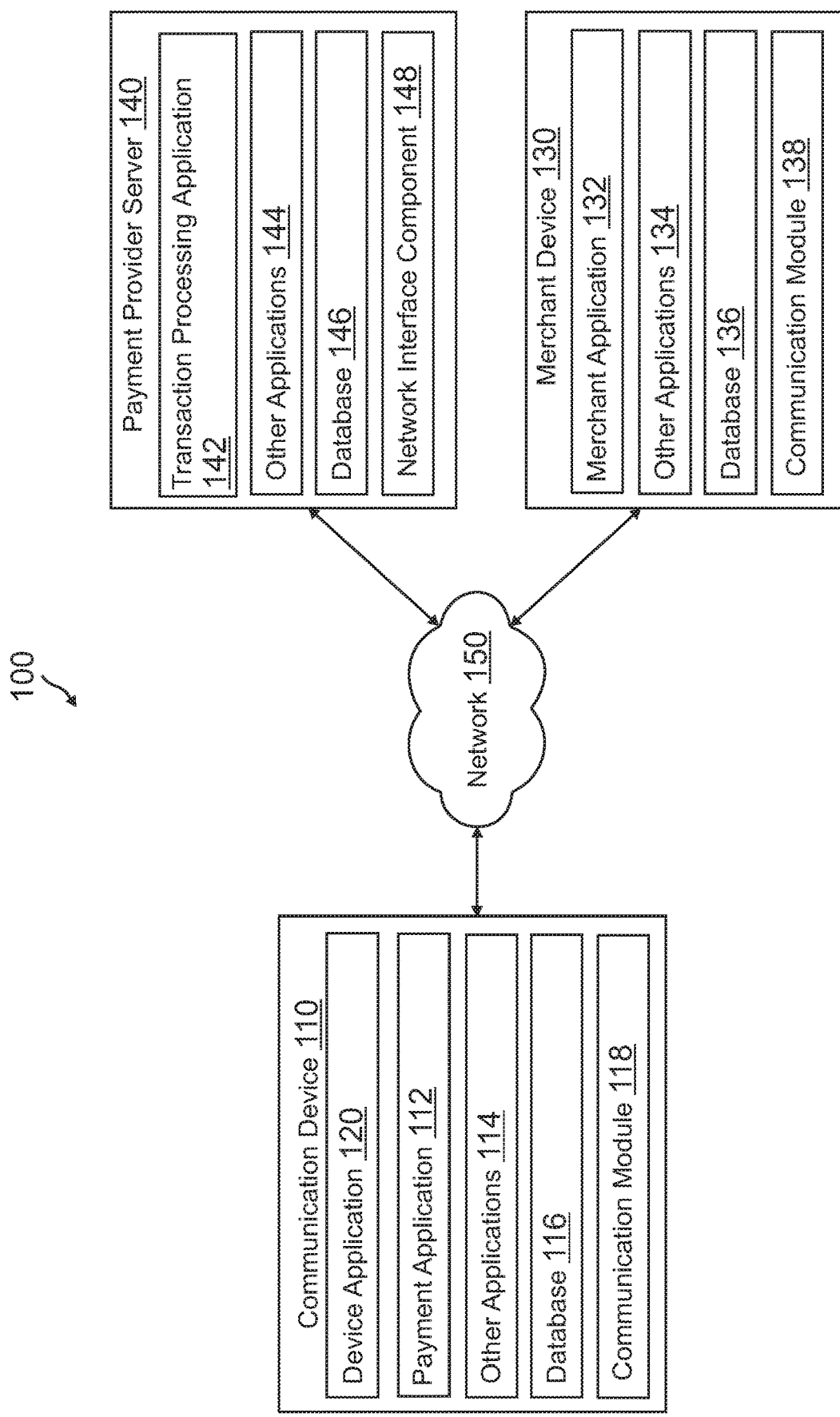
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for application data displayed through a selectable application icon. Systems suitable for practicing methods of the present disclosure are also provided.

A computing device for a user may include a display device, such as an output monitor, touch screen of a mobile phone that displays information and interfaces to a user, or other type of visual output display device. The computing device may further include input devices, such as a mouse, keyboard, and/or touch screen able to detect touch inputs to the touch screen. The device may be configured to execute one or more processes and/or functions, for example, through the use of an operating system and associated device applications. In this regard, the device may include one or more hardware processors to execute the processes and a non-transitory memory to store data used to execute the processes. Thus, the device's memory may store device applications, including payment, messaging, email, phone call, social networking, and/or merchant applications.

Each application may be associated with application data, which may be utilized in the execution of the application. For example, application data may include computer code utilized to cause the computing device to execute the processes of the application and provide various functionalities of the application. Thus, the application data may include application interfaces, processes, and other associated information used during the execution of the application. The application data may include an application icon for the application, which may be displayable on an interface for an operating system of the computing device. The icon may include one or more graphical elements as a visual icon for display in the operating system's interface. The graphical elements may be designed so as to inform the user of the application. For example, the application icon may include graphical elements that appear as a logo for a company associated with the application, a name of the application, a trademark associated with the application or a company providing the application, or other type of element that may inform the user of the application. The application icon may be displayable on a desktop or home screen of the device's operating system, or may be displayable in a sub-folder, disk, or other virtual storage area of the operating system. The application icon may be selectable by the user so that selection of the application icon may open the application and cause the application to execute. In further embodiments where the application is already executing the background of the device's operating system, selection of the application icon may call the application to the front of the operating system's interface to display the application's interface(s) on the output display screen of the computing device.

In this regard, the computing device may include a payment application as one of the device applications, which may be configured to send and receive payments to another party, such as another user and/or a merchant. The payment application may be associated with a payment provider, such as PayPal® or other online payment provider service, which may provide payments and other financial services on behalf of user. The payment application may execute on the computing device for the user, and may provide various functionalities and processes to the user and/or merchant. For example, a user may utilize the payment application to send and/or receive payments between the user and another user/merchant. The user may wish to provide a payment for a transaction with a user/merchant, transfer money to another family/friend, engage in transaction and statement review (e.g., financial dispute resolution services), or perform another financial transaction. Merchants may similarly use payment applications to send and/or receive payments between the merchant and another user/merchant, which may include receiving payment for transactions, providing payments to employees and/or for business expenses, transfer money between accounts, or perform further financial transactions. Other entities, such as charitable organizations and businesses may also utilize the payment application, for example, to receive donations from various parties and/or pay business expenses. The online payment provider may provide such services through the payment application and data sent and received over a network connection between the online payment provider and a device executing the payment application. Additionally, the online payment provider may provide payment accounts and digital wallet services, which may offer financial accounts to send, store, and receive money, process financial instruments, and/or provide transaction histories. The online payment provider may offer further services, such as extension of credit, credit history review, and other financial and personal services.

The payment application may therefore provide one or more processes and features for use of the services provided by the online payment provider. The user of the computing device (e.g., a single or group of users, a merchant, or other entity) may cause the device to execute the payment application by selecting the application, such as through selection of the application icon. When utilizing the application, the application may execute in the foreground of the operating system and present application information to the user, such as a payment account balance or other status, pending and processed payments, receipts, transfer statuses, dispute, account information, and/or other application information. Moreover, the application may execute in the background of the device's operating system and conduct processes while the user is otherwise using the device or has the device on but currently unused (e.g., a locked screen of a mobile smart phone). While the application executes in the background, the various data may be processed, including data received from the online service provider and/or data sent to the online service provider (e.g., a location of the user). When the application is closed, the device may still send data to and receive data from the online service provider, which may be stored to a database and presented to the user when the application is opened and an application interface displayed. In other embodiments, the user of the device may cause another application to execute, which may include service, merchant, messaging, email, social networking, or other application types. Such applications may process, send, and receive other data as described above, including messages and email for a user, locations for the user and other users, nearby users, new statuses, merchant information (e.g., location, payment acceptance mechanisms, benefits and discounts, etc.), and other application information.

However, when the application is not open and an interface is operating in the foreground of the operating system, the user may not be aware of application information that may be relevant and useful to the user. For example, a recently processed transaction and a new account balance may require the user to open the payment application and navigate to an account status interface to view the processed transaction, the amount debited to the account, and the balance now available in the account. Other payment application information may also be displayable in an interface of the application. Similarly, the payment application or a merchant application may be associated with a physical merchant location at or nearby where the user is located, and may accept payments using the user's mobile device. However, the user may be required to open the application and view information on an interface to determine that the merchant accepts payments using the application executing on the mobile device.

In order to provide application information to a user without the user being required to open the application and view an application interface, the payment application or another process or application executing on the device may determine at least one informational element of the application information to present to the user. The informational element(s) may be selected by the payment application randomly or based on various parameters. An application may generally display a most important feature or informational element based on the application, application type, and/or processes of the application. For example, a payment application may wish to display a balance of an associated payment account to the user, as the balance may be the most important or relevant to the user informational element of the application information. Other applications may include other important or relevant informational elements, for example, mobile applications may wish to inform users of location specific information (e.g., tied to the user's current location), social networking applications may wish to inform the user of new statuses of friends or family, and messaging applications may wish to display an unread message.

In various other embodiments, the user may set parameters and preferences for informational elements the user may wish to view. In this regard, the application and/or the device's operating system may allow the user to select preferences for the application (as well as other applications where the operating system configures the application) that determines application information to display to a user through the application icon. The preferences may include a selection of informational element(s) of the application information, including "display account balance," "display new deposit amount," "display daily balance change," "display payment application acceptance at location," or other payment account related information for a payment application. Other information may be request to be displayed for other applications, such as "display new message content," "display nearby merchants," "display nearby offers," or other information.

Additionally, the application may also determine the information to display based on newly received data and/or newly processed data. For example, if a new transaction is processed and the user's account debited, that informational element may be selected for display. Where the application finishes a process, the resulting processed data may be selected. In further embodiments, the information may be selected based on an emergency, such as a potentially fraudulent transaction, a natural disaster, a traffic issue, a nearby crime or dangerous situation, a family or friend emergency message or status, or other type of emergency situation. In other embodiments, use of the application by the user may determine what informational element(s) is/are selected. Thus, the operating system and/or the application may utilize the user's use of the application to determine what informational element(s) to display to the user. For example, if the user's often uses a payment account to view an account balance, the account balance may be selected as the informational element. Similarly, if the user often uses the payment application to pay for items at physical merchant locations, whether the user's current location accepts the payment application may be displayed, as well as a current outgoing payment amount, a daily account balance change, or other metric may be used. Thus, the application and/or operating system may intelligently learn the parts of the application that are most important or frequently used by the user, and display an informational element related to the part of the application most important or used by the user. Thus, the relevant metric may be selected by the device system.

Moreover, additional information may be used to determine which informational elements to display to a user and the content of the informational element. As discussed above, a location of a user may be used to determine whether a merchant at the user's current location accepts payments made through the payment application (e.g., using an online payment provider). Thus, the application and/or the operating system may determine a location of the user, for example, using a GPS locator or other location services component of the device. The location may then be used to determine relevant data, including acceptance of the application at the user's location, nearby merchants accepting payments through the payment application, and/or deals/offers for nearby merchants. Where the application may correspond to another application, other data may be determined using the location, such as directions, nearby known users, etc. The informational element selected may correspond to the location, such as selection of merchant payment acceptance mechanisms at the user's location where relevant instead of a payment account balance. However, where the informational element is already selected based on other information or preferences, the location may be used to determine the content of the informational element, such as whether the payment application is accepted for payments at the location. Additional data received or processed by the application may also be used to select the type and/or content of an informational element to display on the application, including biometrics of the user, messages and emails, or other accessible data. Additionally, in certain embodiments, multiple informational elements may be selected, which may each include separate application information. For example, the user may set multiple preferences of information to display on the application icon, such as a balance, daily balance change, dispute status, etc. In other embodiments, the application and/or operating system may determine each of the multiple informational elements to display to the user, such as through use of the application, important nearby information, or other available data.

In order to present the informational element(s) to the user without the application interfaces required to be open and/or presented on the foreground of the device's display screen, the application and/or operating system and present the informational element(s) on or with the application icon for the application. For example, the informational element may be superimposed on top of the graphical element making up the application icon (e.g., the logo, trademark, or other graphic used as the application icon). Thus, the application icon may be processed with the information element in order to display the informational element to the user through the application icon. The informational element may be presented on the application icon, for example, across the top, bottom, or side of the graphical element for the icon. The informational element may be nearby and/or attached to the application icon, including in a corner, as a border, below, above, or otherwise nearby the application icon. The informational element may be presented as text, numbers, and/or graphics. Additionally, the informational element may be color coded, font coded, or otherwise presented in an intuitive manner to the user. For example, account debits may include a minus (−) sign before and be presented in red font, while account deposits may include a plus (+) sign and a green font. Other graphical representations may also be used, such as a compass direction to a nearby target, a flashing light indicating application acceptance as the location, etc.

The informational icon may be displayed prior to login to the application and/or opening the application. For example, the processes to present the informational element with the application icon may execute without the application being opened and/or currently executing (e.g., by the operating system) and may present the information on the application icon while the application is closed. The informational element on the icon may also be presented while the application is running but an interface of the application is not in the foreground of the operating system (e.g., the user if viewing a home screen or sub-folder of the operating system). Moreover, in certain embodiments, the user may set preference and/or the application may require the user to first open the application and/or login, for example, where the informational element includes sensitive information. Additionally, where there are multiple informational elements, the process may scroll through the informational elements presented on the application icon, which may occur at preset or customizable intervals (e.g., present each element for 5 seconds). In various embodiments, the informational element may also be displayed within a banner or other icon badge on a lock screen, home screen, dropdown menu, or other interface of the operating system. For example, the user may elect to have a banner or badge for the application and/or the application icon visible on a lock screen or within a dashboard menu of the communication device. Thus, the customized application icon, banner, or badge displaying the informational element may also be displayed on such an interface.

Selection of the application icon while an informational element is presented may cause the application to immediately open to a window, interface, or process associated with the informational element. For example, if the application icon displays an account balance as the informational element, selection of the application icon while the account balance is displayed may immediately open an interface for the account balance and statement history (e.g., past transactions using the account). Similarly, if the icon shows a processed payment, selection of the icon may bring an interface for the transaction, including transaction information for a time, place, merchant, etc. for the transaction, an amount of the transaction, items in the transaction, and/or transaction dispute or cancellation option. Where multiple informational elements may be scrolled through on the application icon, selection of the application icon when a specific informational element is presented may cause the application to open to the window, interface, or processes associated with that specific informational element. Thus, the user may view the informational element and quickly navigate to the associated application process when the informational element is presented.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user (not shown), a communication device 110, a merchant server 130, and a payment provider server 140 in communication over a network 150. The user may utilize communication device 110 to utilize the various features available for communication device 110, which may include processes and/or applications associated with communication device 110, merchant server 130, and/or payment provider server 140. Communication device 110 may further be utilized to provide payments to one or more entities, such as other users and/or merchants (e.g., a merchant associated with merchant server 130), through an application executing on communication device 110. Various payment processes and features may be executed using payment provider server 140. Additionally, communication device 110 may be used to present information elements for information presented to the user using application icons for applications of communication device 110. The informational elements may be determined using merchant server 130 and/or payment provider server 140.

Communication device 110, merchant server 130, and payment provider server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with merchant server 130, and/or payment provider server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Communication device 110 may execute a variety of applications, including payment and other mobile applications. Although only one communication device is shown, a plurality of communication devices may function similarly.

Communication device 110 of FIG. 1 contains a device application 120, a payment application 112, other applications 114, a database 116, and a communication module 118. Touch interface component 120, device application 120, payment application 112, and other applications 114 may correspond to executable processes, procedures, and/or applications with associated hardware. In other embodiments, communication device 110 may include additional or different modules having specialized hardware and/or software as required.

Device application 120 may correspond to one or more processes to execute software of communication device 110, including execution of an operating system for communication device 110 or an application executable by communication device 110 using an operating system of communication device 110. In this regard, device application 120 may correspond to specialized hardware and/or software utilized by communication device 110 to provide processes and features to a user utilizing communication device 110. In various embodiments, device application 120 may correspond to an operating system, which may include system software that manages and controls hardware and software resources of communication device 110. The operating system may provide a set of services to the user of communication device 110, including access of various device hardware and software features, management of device resources, and data processing. The services may be commonly used by applications of communication device 110. Thus, additional applications and programs may require the operating system to function, where the operating system may assist communication device 110 with executing codeable processes. The operating system may further provide additional functions, such as receiving and processing input, outputting data to a user through one or more output devices (e.g., displays, speakers, etc.), processor management and process allocation, and memory management and allocation. The operating system and correspond to a mobile device, tablet computer, or home computing device. Where device application 120 functions as an operating system, device application 120 may provide processing of application icons to present informational elements, as discussed herein.

In other embodiments, device application 120 may correspond to an application for execution by communication device 110 through an operating system. For example, device application 120 may correspond to a social networking, messaging, email, media playback, camera, image/video, or other type of device application. Device application 120 may include application data, including an application icon having a graphical element. The application data may further include application information, such as received and/or processed data for device application 120. Such application information may include one or more informational elements to presentation to a user through the application icon for device application 120, as discussed herein. Thus, the operating system and/or device application 120 may determine the informational element(s) and process the application icon to present the informational element(s) to the user through the application icon.

Payment application 112 may correspond to one or more processes to execute software modules and associated devices of communication device 110 to enter one or more payment instruments or other funding sources for storage in a digital wallet associated with a payment account (e.g., stored and/or serviced by payment provider server 140), access the digital wallet and/or payment account for use, and provide payments to another entity. In this regard, payment application 112 may correspond to specialized hardware and/or software utilized by a user of communication device 110 that provides an interface to permit the user to enter input and other data for payment instruments, for example, through an input device (e.g., touch screen with a graphical user interface displayed by payment application 112, keypad/keyboard, mouse, etc.) and/or through a data capture device (e.g., scanner, camera, other optical device, etc.) In various embodiments, information for the payment account may also be stored to communication device 110 for use in an offline environment. The payment account accessible through payment application 112 may be used to initiate, receive, and/or process/complete transactions using services provided by payment provider server 140. Once entered, the payment instruments may be communicated to payment provider server 140 over network 150 by payment application 112 for establishment and/or maintenance/update of the payment account and/or entry into the digital wallet. The user of communication device 110 may also enter benefits to payment application 112. The benefits may correspond to one or more of rewards programs, rewards programs membership level, rewards program points, available items in at least one rewards program, cash-back amounts for the at least one rewards program, airline miles, promotional credit, promotional credit rates, promotional discount rate, merchant discounts, merchant discount rates, and merchant coupons.

Payment application 112 may be implemented as a user interface enabling the user to select and provide payment. In various embodiments, payment application 112 may include a general browser application configured to retrieve, present, and communicate information over the Internet (e.g., utilize resources on the World Wide Web) or a private network. For example, payment application 112 may provide a web browser, which may send and receive information over network 150, including retrieving website information (e.g., a website for payment provider server 140), presenting the website information to the user, and/or communicating information to the website, including payment information for payment through payment provider server 140. However, in other embodiments, payment application 112 may include a dedicated application of payment provider server 140 or other entity (e.g., a merchant), which may be configured to assist in processing purchase requests.

Payment application 112 may be utilized to select payment instrument(s) for use during in providing payment for a transaction, transfer, or other financial process. As discussed herein, payment application 112 may utilize user financial information, such as a credit card, bank account, or other financial account, as a payment instrument when providing payment information. Additionally, payment application 112 may utilize a user account with payment provider, such as payment provider server 140, as the payment instrument. Selection of a payment instrument may occur prior to, at, or after establishment of the financial process. Payment provider server 140 may then use the payment instrument during processing of payment, as discussed herein with respect to payment provider server 140. Payment application 112 may be utilized to view the results of payment, for example, using transaction histories, dispute resolution processes, and other post-transaction process.

Device application 120, payment application 112, and/or an operating system of communication device 110 may include application icon processes used to present application information to a user through an application icon for the application corresponding to the application information. In this regard, the application icon processes executed by one of device application 120, payment application 112, and/or an operating system of communication device 110 may first determine at least one informational element of application data to display to the user through the application icon. The application icon processes may automatically and generally include an informational element selected to be displayed to a user, such as a default informational element, which may be static or changeable by the user of communication device 110. For example, payment application 112 may generally default to selecting an account balance informational element to present to a user. Similarly, the operating system of communication device 110 may determine that an application is directed to a certain subject and/or that certain information is used by the application, and select information element(s) tied to that subject and/or used information for display. In other embodiments, the informational element may be a most important informational element, which may be general for device application 120 and/or payment application 112, or specific to current data accessible for communication device 110. For example, a general useful information element for payment application 112 may include an account balance, a recent transaction debit/credit, and/or a daily balance change. Thus, the application icon processes may select any of the aforementioned informational elements for presentation to the user. However, where other data is available, such as a location, biometric, message, etc., the application icon processes may select a more specific informational element considered to be important or useful, such as acceptance of payment application 112 at a location.

Thus, in various embodiments, additional information accessible to communication device 110 may be used to determine an informational element to display to the user of communication device 110. A location of a user may be determined using a GPS locator or other location services component of the device. Using the location, the application icon processes may determine associated data, such as nearby merchants offering deals and benefits to the user, acceptance of payment application 112 for payments, nearby friends, directions, etc. The application icon processes may then determine an information element for the relevant information for the location, and may determine content to display to the user based on the location (e.g., an "accepted here" message for merchant locations accepting payment application 112). Other types of associated data used to determine an informational element by the application icon processes may include biometrics of the user, messages and emails, social networking posts, locations of other friends/family/merchants, available media, or other accessible data.

In other embodiments, the informational element selected by the application icon processes may include recently received or processed data for device application 120 and/or payment application 112. Recently received data may include data from payment provider server 140, such as a new debit/credit to an account, a dispute resolution or other status, a processed transaction, a transfer, a transaction status, merchant information for nearby merchants, etc.

Additionally, device application 120 may receive merchant information, sales, offers, locations, and other data from merchant server 130. Device application 120 may also receive other application related data corresponding to the function and processes of device application 120, including messages, emails, social networking status, available media, etc. In various embodiments, another application's information may cause selection of the informational element. For example, information for a recent email may be added to a contact list, where a message that a contact has been added or updated may be presented as the informational element on a contact list icon.

In various other embodiments, the user may set parameters and preferences for informational elements the user may wish to view. In this regard, device application 120, payment application 112, and/or communication device 110's operating system may allow the user to select preferences for the informational element an application displays on the application's icon. For example, a setup and/or configuration screen may be used to establish the preferences of what application information a user would like to see "before login" or "on the application icon." The user may select one or more options of the information element type, name, or other identifier, which may cause the informational element associated with that selection from the application information to be displayed on the application icon for the application.

In other embodiments, device application 120, payment application 112, and/or communication device 110's operating system may intelligently select the information element based on use of the application by the user. For example, if the user often checks an account balance in payment application 112 and/or uses payment application 112 for real-world purchases at physical merchant locations, one or more informational elements associated with this use may be selected. Where device application 120 is used to execute a certain process, one or more informational elements having data presentable to the user for this process may also be selected. The application icon processes of device application 120, payment application 112, and/or communication device 110's operating system may review use of the application by communication device 110's user and may update or change the presentable informational element based on changes in use. Thus, the application and/or operating system may intelligently learn the parts of the application that are most important or frequently used by the user, determine the relevant metric, and present the metric as an informational element to the user.

The application icon processes may select a single informational element using the aforementioned processes, or may select multiple informational elements from the application information. Such selection may be done automatically by the application icon processes, or may be made based on preferences set by the user. For example, the user may set multiple preferences of information to display on the application icon, such as a balance, daily balance change, dispute status, etc. In other embodiments, the application and/or operating system may determine each of the multiple informational elements to display to the user, such as through use of the application, important nearby information, or other process as described herein.

Presentation of the selection informational element(s) by the application icon processes may occur through the application icon for device application 120 and/or payment application 112. The application icon may include one or more graphics, or graphical elements/features that are used to visually represent the application and allow the user to easily identify the application (e.g., through association of the graphical elements with the application). Thus, the graphical elements may include a trademark, such as a logo, symbol, name, or other identifier for the application. Other graphical elements may include characters, application images, text, etc., which may visually represent the application. The informational element(s) may then be superimposed on top of the graphical element(s), which may be placed in the center, bottom, side, or other area of the application icon. In other embodiments, the informational element may surround, be located on a corner, above, below, or otherwise act as a border to the application icon. The informational element(s) may be presented as text, numbers, and/or graphics, and may including colors, fonts, or other features. The features of the informational element(s) may be coded in order to allow the user to easily decipher the information of the informational element. For example, red color may be used for debits, missed messages, or emergencies. Similarly, green color may be used for deposits, potential savings, etc. Other graphical representations may also be used, such as a compass direction to a nearby target, a flashing light indicating application acceptance as the location.

Thus, a customized application icon may be generated having the informational element(s) presented with the application icon's graphical elements and features. The customized icon with the informational elements may be displayed prior to login to the application and/or opening the application, for example, without the application being opened and/or currently executing. In other embodiments, the informational element may only be presented on the application icon when the application is executing, but may be in a background of the operating system and not currently open in the foreground interface. Moreover, certain informational elements may only be presented after a login or authentication, for example, where the informational element includes sensitive information or the user has set a preference requiring authentication. Additionally, where there are multiple informational elements, the process may scroll through the informational elements presented on the application icon, which may occur at preset or customizable time intervals.

Selection of the application icon while an informational element is presented may cause the application to immediately open to a window, interface, or process associated with the informational element. For example, payment application 112's application icon may display a current balance or a received payment/credit to an account of the user and used by payment application 112. Thus, selection of the application icon for payment application 112 during presentation of one of these informational elements may open a corresponding webpage, interface, window, or other process that is associated with that informational element. Where multiple informational elements are scrolled through on the application icon, this may allow the user to quickly navigate to any of the associated processes by selecting the application icon when the desired informational element is displayed with the application icon.

One or more of the aforementioned features and/or processes of device application 120 may be included within payment application 112 or vice versa, for example, to provide their respective features within one application and/or application interface.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications may include social networking applications, media viewing, and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use device components of communication device 110, such as output display devices capable of displaying information to users and other output devices, including speakers.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with payment application 112 and/or other applications 114, identifiers associated with hardware of communication device 110, or other appropriate identifiers, such as identifiers used for payment/user/device authentication or identification, which may be communicated as identifying communication device 110 to payment provider server 140. Database 116 may include application data for an application, such as application icon data and application information used during the execution of an application. Additionally, customized application icons and/or selected informational elements for an application may be stored to database 116.

Communication device 110 includes at least one communication module 118 adapted to communicate with merchant server 130 and/or payment provider server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant server 130 may be implemented using any appropriate hardware and software configured for wired and/or wireless communication with communication device 110 and/or payment provider server 140. Although described below as a server, merchant server 130 may correspond to a device, server, or cloud computing architecture to provide sales of items, for example, through an online marketplace accessible over a network connection with merchant server 130 and/or a physical merchant location. Merchant server 130 may further be used to process payments for items and provide incentives for purchase of items and/or advertisement of items to other users. Although only one merchant server is shown, a plurality of merchant servers may function similarly.

Merchant server 130 of FIG. 1 contains a merchant application 132, other applications 134, a database 136, and a communication module 138. Merchant application 132 and other applications 134 may correspond to processes, procedures, and/or applications executable by a hardware processor, for example, a software program. In other embodiments, merchant server 130 may include additional or different modules having specialized hardware and/or software as required.

Merchant application 132 may correspond to one or more processes to execute modules and associated specialized hardware of merchant server 130 that provides an interface and/or online marketplace to sell one or more items offered by a merchant (not shown) associated with merchant server 130, and further provide checkout and payment processes for a transaction to purchase the items for sale from the merchant corresponding to merchant server 130. In this regard, merchant application 132 may correspond to specialized hardware and/or software of merchant server 130 to provide a convenient interface to permit a merchant offer items for sale. For example, merchant application 132 may be implemented as an application offering items for sale that may be utilized by the merchant or a merchant employee to enter items selected by a user to a transaction, determine a price for the transaction, and initiate a checkout and payment process for the transaction. In other embodiments, merchant application 132 may be accessed by communication device 110 to select the items for sale to the user associated with communication device 110. In certain embodiments, merchant application 132 may correspond to a website available over the Internet and/or online content and/or database information accessible through a dedicated application. Thus, sales module 160 may provide item sales through an online marketplace using the website of the merchant. However, in other embodiments, merchant server 130 may be local to a physical merchant location and provide transaction processing processes through interfaces displayed to a merchant or merchant employee at the merchant location.

Merchant application 132 may include information for a price for the item, a discount for the item, a price change for the item, and/or other incentives for items and/or with the merchant corresponding to merchant server 130 (e.g., rebates, payments, etc.). Merchant application 132 may be used to set and/or determine a benefit or incentive provided to a user of communication device 110. The sales data and other item data may be retrievable by communication device 110 and/or payment provider server 140, such as requestable through an API call, retrievable from a database, and/or scraped from an online resource. The information may be based updated periodically or continuously, such as in real time and information for the item(s) for sale changes. Merchant application 132 may also include merchant information, such as a merchant location, payment mechanisms accepted by the merchant, and other relevant data for a merchant. Communication device 110 may receive and/or request the merchant information, for example, when determining an informational element to present to a user on an application icon.

Merchant application 132 may be used to establish a transaction once the user associated with communication device 110 has selected one or more items for purchase. Once a payment amount is determined for the transaction for the item(s) to be purchased, merchant application 132 may request payment from the user. Merchant application 132 may receive payment processing information, such as a payment and a receipt. In such embodiments, the payment request may be processed, payment provided to the merchant account, and notification of payment (or failure, for example, where there are insufficient user funds) may be sent to merchant application 132. The payment may be made by payment provider server 140 on behalf of the user associated with communication device 110. Merchant application 132 may then receive the results of the transaction processing, and complete the transaction with the user, for example, by providing the user the items for the transaction or declining the transaction where the user is not authenticated or the transaction is not authorized (e.g., insufficient funds).

Merchant server 130 includes other applications 134 as may be desired in particular embodiments to provide features to merchant server 130. For example, other applications 134 may include security applications for implementing server-side security features, programmatic client applications for interfacing with appropriate application programming interfaces (APIs) over network 150, or other types of applications. Other applications 134 may also include email, texting, voice and IM applications that allow a user to send and receive emails, calls, texts, and other notifications through network 150. In various embodiments, other applications 134 may include financial applications, such as banking, online payments, money transfer, or other applications associated with payment provider server 140. Other applications 134 may contain software programs, executable by a processor, including a graphical user interface (GUI) configured to provide an interface to the user.

Merchant server 130 may further include database 136 which may include, for example, identifiers such as operating system registry entries, cookies associated with merchant application 132 and/or other applications 134, identifiers associated with hardware of merchant server 130, or other appropriate identifiers, such as identifiers used for payment/user/device authentication or identification. Identifiers in database 136 may be used by a payment/credit provider, such as payment provider server 140, to associate merchant server 130 with a particular account maintained by the payment/credit provider. Merchant, item, sales, and/or benefit information for items sold by the merchant associated with merchant server 130 may be stored to database 136. Database 136 may further include transaction information and/or results, including transaction histories.

Merchant server 130 includes at least one communication module 138 adapted to communicate with communication device 110 and/or payment provider server 140. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Payment provider server 140 may be maintained, for example, by an online service provider, which may provide payment and financial services to a user. In this regard, payment provider server 140 includes one or more processing applications which may be configured to interact with communication device 110, merchant device 150, and/or another device/server to provide transaction processing, account services, and other financial processes. In one example, payment provider server 140 may be provided by PAYPAL®, Inc. of San Jose, CA, USA. However, in other embodiments, payment provider server 140 may be maintained by or include another type of service provider, which may provide connection services to a plurality of users.

Payment provider server 140 of FIG. 1 includes a transaction processing application 142, other applications 144, a database 146, and a network interface component 148. Transaction processing application 142 and other applications 144 may correspond to executable processes, procedures, and/or applications with associated hardware. In other embodiments, payment provider server 140 may include additional or different modules having specialized hardware and/or software as required.

Transaction processing application 142 may correspond to one or more processes to execute software modules and associated specialized hardware of payment provider server 140 to provide payment services to merchants and users, for example though a payment account and/or payment instruments. In this regard, transaction processing application 142 may correspond to specialized hardware and/or software to provide payment services and payment accounts, including digital wallets storing payment instruments. The payment services may allow for a payment to the merchant by a user through a payment instrument, including a credit/debit card, banking account, payment account with payment provider server 140, and/or other financial instrument. In order to establish a payment account for a merchant and/or user to send and receive payments, transaction processing application 142 may receive information requesting establishment of the payment account. The information may include user personal and/or financial information. Additionally the information may include a login, account name, password, PIN, or other account creation information. The merchant/user may provide a name, address, social security number, or other personal information necessary to establish the account and/or effectuate payments through the account. Transaction processing application 142 may further allow the merchant/user to service and maintain the payment account, for example, by adding and removing payment instruments. Various information associated with the payment account, such as an account balance, transaction dispute status, pending payment, account change, pending credit, processed payment/credit, or other account information may be pushed to communication device 110, for example, to provide customized application icons presenting the aforementioned information, and/or pulled by communication device 110.

Transaction processing application 142 may be used to provide a payment for an item to a merchant, for example, between communication device 110 and merchant server 130 (e.g., using touch inputs with communication device 110 to effectuate the payment). Transaction processing application 142 may debit an account of the user automatically and provide the payment to an account of the merchant. Transaction processing application 142 may also be used to provide transaction histories for processed transactions. Based on the transaction processing, transaction data may be pushed to communication device 110 and/or pulled by communication device 110. The transaction information may be used by communication device 110 to select informational elements to present to a user and customize application icons using the informational elements.

In various embodiments, payment provider server 140 includes other applications 144 as may be desired in particular embodiments to provide features to payment provider server 134. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing payment provider server 140, where the user or other users may interact with the GUI to more easily view and communicate information. In various embodiments, other applications 144 may include connection and/or communication applications, which may be utilized to communicate information to over network 150.

Additionally, payment provider server 140 includes database 146. As previously discussed, the user and/or the merchant corresponding to telecommunication carrier server 170 may establish one or more digital wallets and/or payment accounts with payment provider server 140. Digital wallets and/or payment accounts in database 146 may include user information, such as name, address, birthdate, payment instruments/funding sources, additional user financial information, user preferences, and/or other desired user data. Users may link to their respective digital wallets and/or payment accounts through an account, user, merchant, and/or device identifier. Thus, when an identifier is transmitted to payment provider server 140, e.g. from communication device 110, one or more digital wallets and/or payment accounts belonging to the users may be found. Database 146 may also store the user preferences for an account for the user and/or merchant.

In various embodiments, payment provider server 140 includes at least one network interface component 148 adapted to communicate communication device 110 and/or merchant server 130 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

FIG. 2A is an exemplary computing device interface having a customized application icon presenting application information, according to an embodiment. Environment 200a includes a communication device 110 corresponding generally to the described features, processes, and components of communication device 110 in environment 100 of FIG. 1. In this regard, a user utilizing communication device 110 may view an interface 1000 on communication device 110, where interface 1000 corresponds to an interface of a payment application, such as payment application 112 of communication device 110 in environment 100 of FIG. 1.

Interface 1000 displays a screen of an operating system of communication device 110, which may display a customized application icon displaying an informational element of an application on communication device 110. For example, interface 1000 includes a money window 1002 corresponding to an operating system folder window having financial applications of communication device 110. For example, application icons 1004 may each correspond to a financial application. Application icon 1006 may correspond to a specific financial application associated with an online payment provider. For example, a graphical element 1008 is displayed for the online payment provider. Moreover, an informational element 1010 is shown displayed on application 1006 by presenting informational element 1010 on application icon 1006 and with graphical element 1008. Thus, application icon 1006 is shown as customized with informational element 1010 shown with graphical element 1008 to allow a user to view an account balance ($1,234.54) for an account used by the application corresponding to application icon 1006.

FIG. 2B is an exemplary computing device interface having a customized application icon presenting application information, according to an embodiment. Environment 200b includes a communication device 110 corresponding generally to the described features, processes, and components of communication device 110 in environment 100 of FIG. 1. In this regard, a user utilizing communication device 110 may view an interface 1100 on communication device 110, where interface 1100 corresponds to an interface of a payment application, such as payment application 112 of communication device 110 in environment 100 of FIG. 1.

Environment 200b includes a similar interface layout of communication device 110 to that of environment 200a. Thus, interface 1100 includes a money window 1102 for a similar operating system window having application icons 1104. An application icon 1106 for the online payment provider is again shown with a graphical element 1008 for the online payment provider. However, in environment 200b, an informational element 1110 instead corresponds to a new deposit received to the account of the user with the online payment provider. Thus, informational element 1110 instead shows +$120.22. Informational element 1110 may be selected to be presented on application icon 1006 based on user preferences, and may either update informational element 1010 from environment 200a or be chosen based on user preference, application use by the user, or other selection parameter.

Figures 2C, 2D:
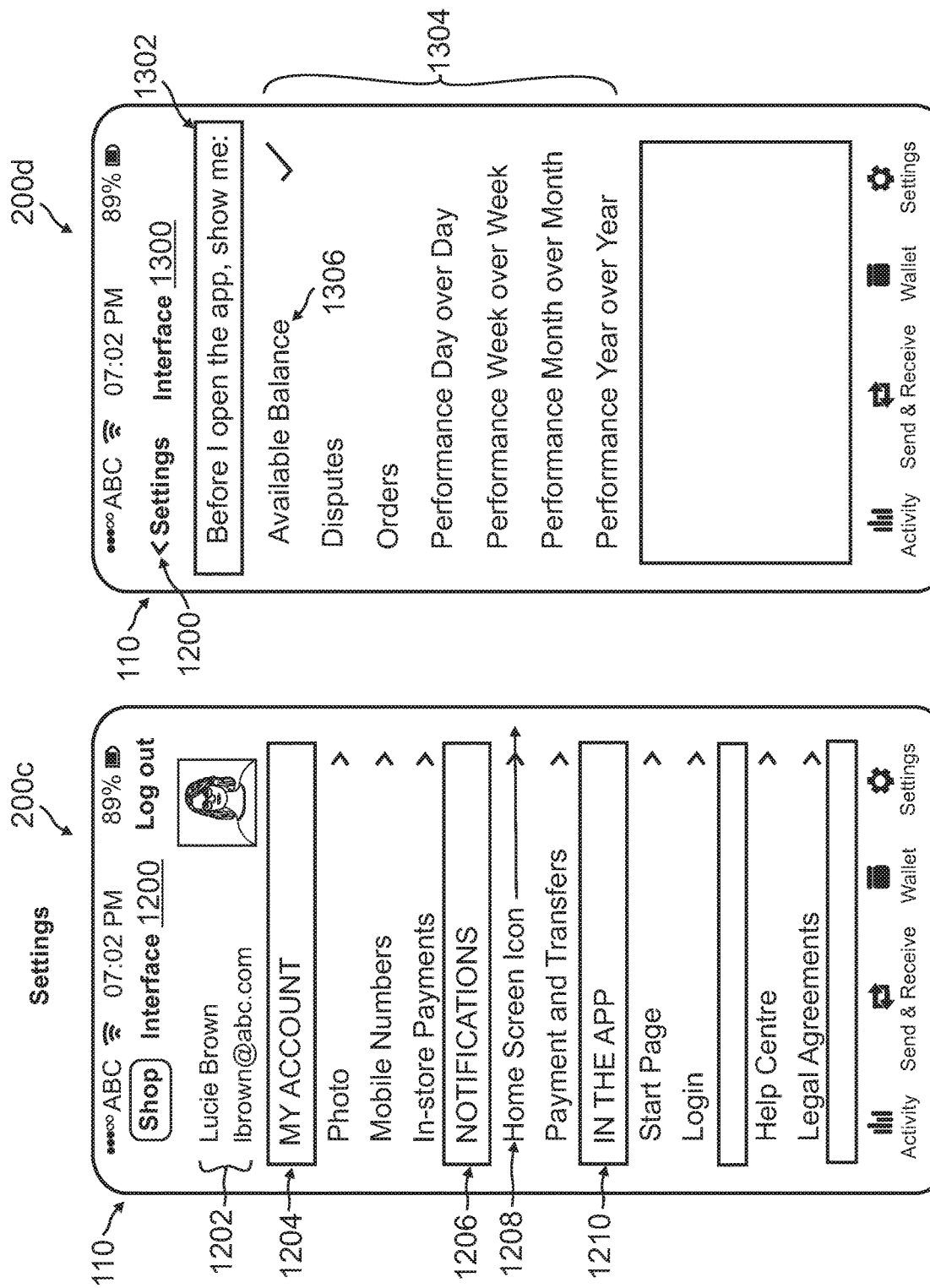
FIG. 2C is an exemplary computing device interface for setup of customized application icons using application information, according to an embodiment.
FIG. 2D is an exemplary computing device interface for setup of customized application icons using application information, according to an embodiment.

FIG. 2C is an exemplary computing device interface for setup of customized application icons using application information, according to an embodiment. Environment 200a includes a communication device 110 corresponding generally to the described features, processes, and components of communication device 110 in environment 100 of FIG. 1. In this regard, a user utilizing communication device 110 may view an interface 1200 on communication device 110, where interface 1200 corresponds to an interface of a payment application, such as payment application 112 of communication device 110 in environment 100 of FIG. 1.

Environment 200c shows an exemplary application and/or operating system interface used to set up and establish informational elements to present on an application icon. For example, interface 1200 includes user information 1202 for an application, such as the payment application corresponding to application icon 1006 and 1106 in environment 200a and environment 200b, respectively. Interface 1200 includes account setting 1204 and application settings 1210. In order to establish informational elements presented on an application icon and other application icon notifications, interface 1200 further includes notification settings 1206. Within notifications settings 1206 include home screen icon settings 1208. Selection of home screen icon settings 1208 may load an interface 1300 shown in environment 200d of FIG. 2D.

FIG. 2D is an exemplary computing device interface for setup of customized application icons using application information, according to an embodiment. Environment 200a includes a communication device 110 corresponding generally to the described features, processes, and components of communication device 110 in environment 100 of FIG. 1. In this regard, a user utilizing communication device 110 may view an interface 1300 on communication device 110, where interface 1300 corresponds to an interface of a payment application, such as payment application 112 of communication device 110 in environment 100 of FIG. 1.

Interface 1300 includes information used to establish informational elements presented on an application icon. Thus, a menu selection 1302 allows selection of information to display on an application element prior to opening the application. Options 1304 allow selection of various informational elements to display to the user on the application icon for the corresponding application. For example, options 1304 includes "available balance," "disputes," "orders," "performance day over day," "performance week over week," "performance month over month," and "performance year over year." Each of options 1304 may be selected by a user. For example, "available balance" is shown as selected option 1306, which can be shown displayed on application icon 1006 of environment 200a as informational element 1010.

Figure 3:
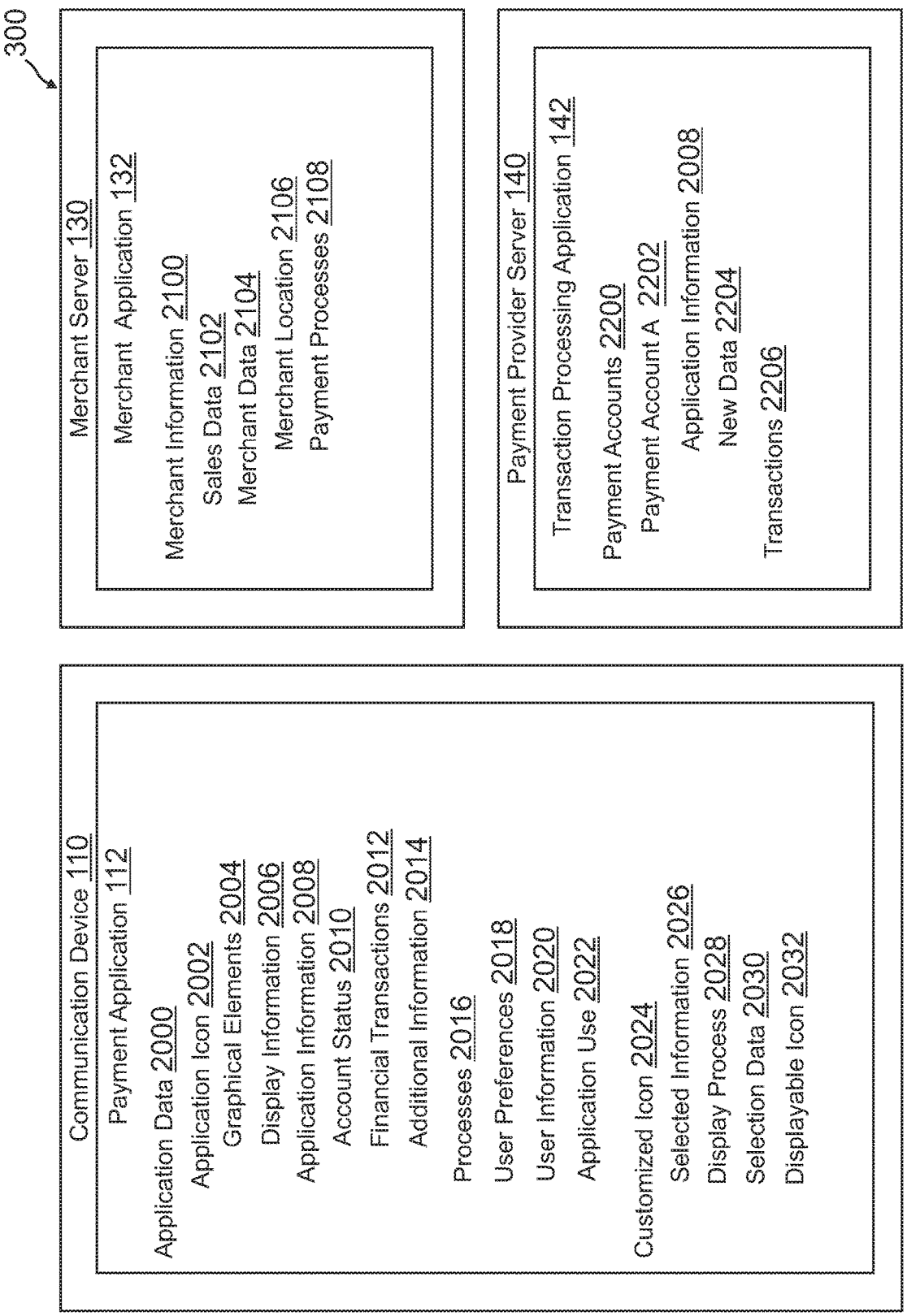
FIG. 3 is an exemplary system environment showing a communication device of a user processing application data for an application to generate a customized application icon having displayed application information, according to an embodiment.

FIG. 3 is an exemplary system environment showing a communication device of a user processing application data for an application to generate a customized application icon having displayed application information, according to an embodiment. FIG. 3 includes communication device 110, merchant server 130, and a payment provider server 140 all discussed in reference to environment 100 of FIG. 1.

Communication device 110 executes payment application 112 corresponding generally to the specialized hardware and/or software modules and processes described in reference to FIG. 1. In this regard, payment application 112 may include information used to determine customized application icons displaying informational elements for application information. Thus, payment application 112 includes application data 2000 for an application. Application data 2000 includes an application icon 2002 having graphical elements 2004 and display information 2006 for display of application icon 2002 to a user through a graphical user interface. Application data 2000 further includes application information 2008 for display to a user and interaction with the user during use of the application. Application information 2008 may include an account status 2010 for an account (e.g., a payment account), financial transactions 2012, and/or additional information 2014. Additional data stored to application data 2000 may include processes 2016 for execution by the application, user preferences 2018 of application information 2008 to display to a user using application icon 2002, user information 2020 used to select application information 2008 for display, and/or application use 2022 used to select application information 2008 for display. In various embodiments, payment application 112 further includes customized icon 2024 once generated using a selected informational element from application information 2008, which may include selected information 2026, display process 2028, selection data 2030, and a displayable icon 2032.

Merchant server 130 executes merchant application 132 corresponding generally to the specialized hardware and/or software modules and processes described in reference to FIG. 1. In this regard, merchant application 132 may be used to establish and/or process a transaction between communication device 110 and merchant server 130, and provide item and merchant information to communication device 110 for generation of customized icon 2024. Thus, merchant application 132 includes merchant information 2100. Merchant information 2100 may include merchant, item, sales, and/or benefit information for a merchant corresponding to merchant server 130. For example, merchant information 2100 includes sales data 2102 for one or more items and merchant data 2104 for the merchant. Merchant data 2104 may include a merchant location 2106 and payment processes 2108 accepted by the merchant at merchant location 2106.

Payment provider server 140 executes transaction processing application 142 corresponding generally to the specialized hardware and/or software modules and processes described in reference to FIG. 1. In this regard, transaction processing application 142 may be used to process a transaction between communication device 110 and merchant server 130 and provide payment accounts to users, which may include information presented in payment application 112. For example, transaction processing application 142 includes payment accounts 2200 for users, which may include a payment account A 2202 for the user of communication device 110. Payment account A 2202 includes application information 2008 used by payment application 112, as well as new data 2204, which may be communicated to communication device 110. In various embodiments, transaction processing application 142 further includes transaction 2206 processed by payment provider server 140.

Figure 4:
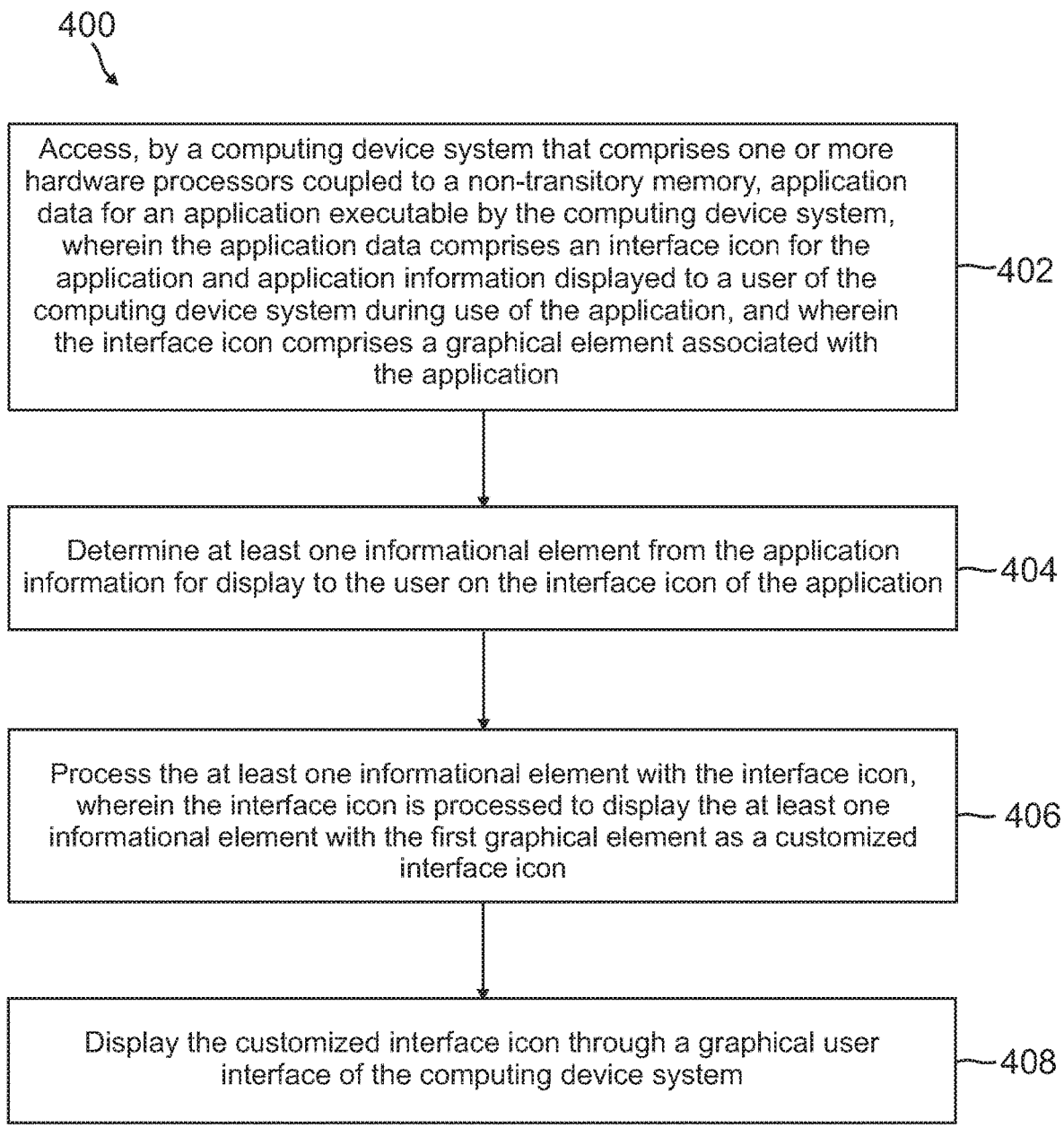
FIG. 4 is a flowchart of an exemplary process for application data displayed through a selectable application icon, according to an embodiment.

FIG. 4 is a flowchart of an exemplary process for application data displayed through a selectable application icon, according to an embodiment. Note that one or more steps, processes, and methods described herein may be omitted, performed in a different sequence, or combined as desired or appropriate.

At step 402, first application data for a first application executable by the computing device system is accessed by a computing device system that comprises one or more hardware processors coupled to a non-transitory memory, wherein the first application data comprises a first application icon for the first application and first application information displayed to a user of the computing device system during use of the first application, and wherein the first application icon comprises a first graphical element associated with the first application. The first application may comprise a payment application for an online payment provider, wherein the first graphical element comprises a logo of the online payment provider. The first application icon may be displayed on a home screen interface of an operating system of the computing device system. For example, the computing device system may comprise a mobile phone device, wherein the first application comprises a mobile application of the mobile phone device.

At least one first informational element from the first application information for display to the user on the first application icon of the first application is determined, at step 404. The at least one first informational element may comprise at least one of an account balance of an account for the user with the online payment provider, a dispute history for the account, a new payment received to the account, a new debit to the account, a new transfer using the account, a pending order status of the user using the account, and a pending payment status to the account. In other embodiments, the at least one first informational element may comprise a financial status, a new message, a new email, phone message information, stock information for a financial investment of the user, and a social networking connection. In various embodiments, a location of the user may be determined using a location detection service, a merchant at the location may be determined, and whether the merchant at the location accepts the online payment provider may be determined. Thus, the informational element may comprise a notification of whether the merchant accepts the online payment provider for payments. In other embodiments, nearby merchants accepting the online payment provider and merchant information for the nearby merchants using the location of the user may be determined, wherein the merchant information comprises offers for the nearby merchants and a notification provided as the at least one first informational element corresponding to the nearby merchants. For example, a predefined proximity surrounding the user may define the nearby merchants and/or distance to search for the nearby merchants.

In various embodiments, the at least one first informational element is determined based on an importance of the at least one informational element to the user, and wherein the importance is determined based on user preferences for the user. The user preferences may be one of set by user with the application, determined using user personal and financial information, and determined through use of the application by the user. The at least one first informational element is processed with the first application icon, wherein the first application icon is processed to display the at least one first informational element with the first graphical element as a first customized application icon, at step 406.

At step 408, the first customized application icon is displayed through a graphical user interface of the computing device system. A selection of the first application icon displaying the at least one first informational element may be received, and an interface of the application associated with the at least one first informational element displayed with the first application icon may be automatically opened. Additionally, the at least one first informational element may be a plurality of informational elements, wherein the first customized application icon automatically scrolls through the plurality of information elements. In such embodiments, an interface of the first application associated with the one of the plurality of informational elements displayed with the first application icon may be automatically opened when the first customized application icon is selected having one of the plurality of informational elements displayed.

In various embodiments, second application data for a second application executable by the computing device system is accessed, wherein the second application data comprises a second application icon for the second application and second application information displayed to the user of the computing device system during use of the second application, and wherein the second application icon comprises a second graphical element associated with the second application. At least one second informational element from the second application information for display to the user is determined, wherein the at least one second informational element is determined using the at least one first informational element, and the at least one second information element is displayed on at least one of the first customized application icon and a second customized application icon for the second application. Moreover, the at least one first informational element may be updated on the first customized application icon based on newly received information by the computing device system. In other embodiments, at least one second informational element of the first application information is determined based on at least one of user preferences, location information for the user, and user information. Thus, the first customized application icon is updated with the at least one second information element displayed with the first graphical element.

Figure 5:
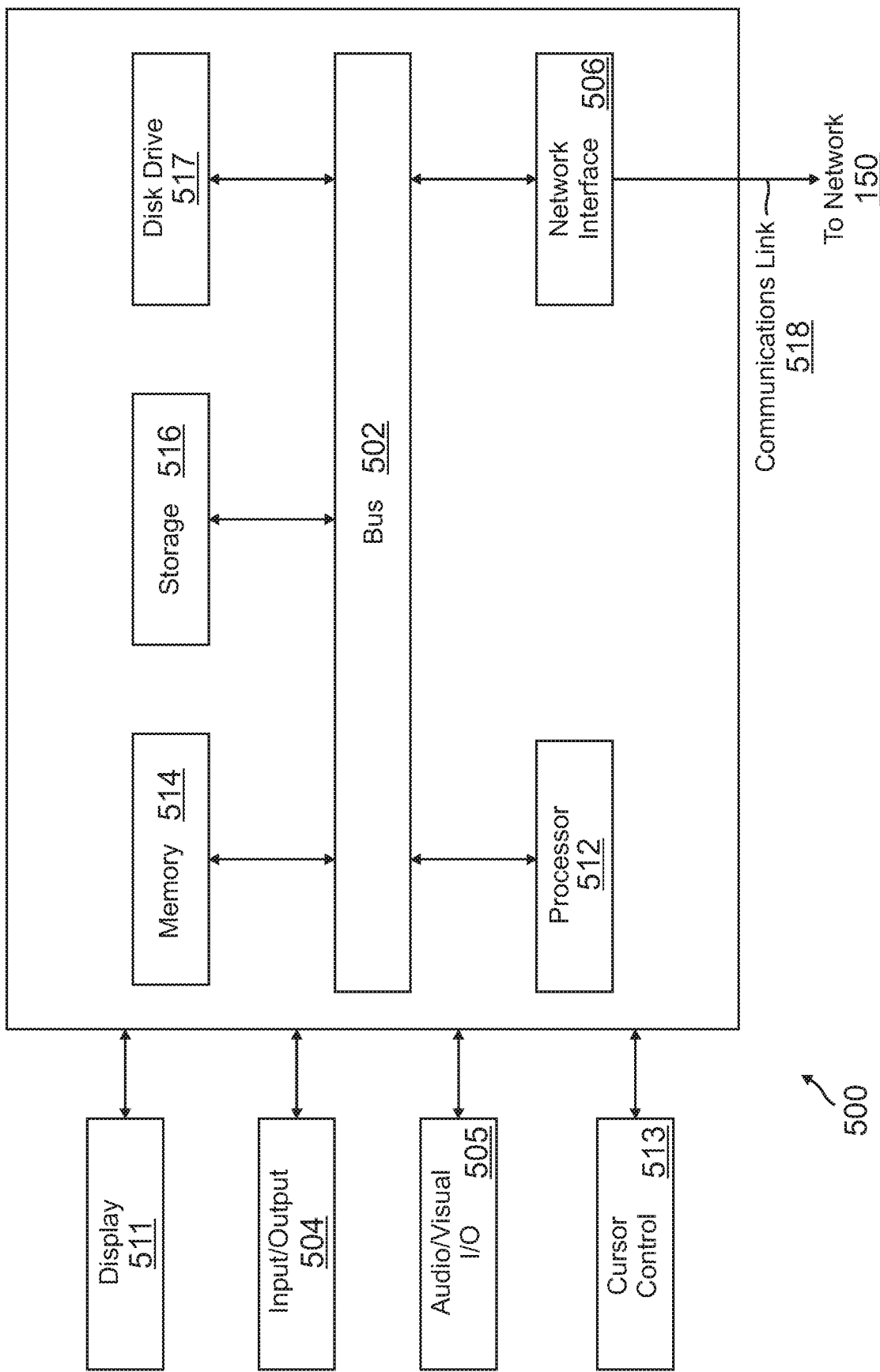
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
receiving, by a user device, application data for a mobile application on the user device, wherein the mobile application provides access to an account associated with the application data;
identifying an informational element associated with the application data and the account for an application graphic of the mobile application, wherein the application graphic is displayable via a home screen of an operating system of the user device independent of an opening the mobile application on the operating system for access to the informational element;
identifying a current usage of the user device by the mobile application at a current location of the user device, wherein the current usage is associated with providing a payment for the transaction at the current location using the account;
determining that the informational element has an update that is presentable via the application graphic based on the application data and the current usage of the user device, wherein the update provides information associated with the account and the current usage at the current location;
generating display data for the update to the informational element in the application graphic based on the current location, the current usage, and the application graphic; and
displaying, based on the display data, the update for the informational element in the application graphic on the home screen simultaneously with at least one additional application graphic for at least one additional mobile application, wherein the update is displayed independent of the opening of the mobile application.

2. The method of claim 1, wherein, prior to the generating the display data, the method further comprises:
determining additional data for the update based on the current usage of the user device and the application data to be presented for the update in the informational element, wherein the transaction is associated with a merchant associated with the current location.

3. The method of claim 1, further comprising:
determining a relative importance of each a plurality of informational elements including the informational element that are presentable via the application graphic based on the application data; and
selecting the informational element for the application graphic based on the relative importance and the update.

4. The method of claim 1, wherein the receiving the application data comprises one of detecting a push event of the application data to the mobile application or receiving real-time stream data including the application data from at least one service provider.

5. The method of claim 1, further comprising:
receiving a selection of the application graphic via the home screen;
opening the mobile application based on the selection; and
navigating to a user interface including at least a portion of the application data associated with the update.

6. The method of claim 1, wherein the identifying the informational element, the identifying the current usage, the determining, the generating, and the displaying are performed by the operating system independent of executing the mobile application or running the mobile application in a foreground of the home screen.

7. The method of claim 1, wherein the operating system displays the home screen via a graphical user interface, and wherein the application graphic comprises one of an icon or a customized home screen field in the graphical user interface.

8. The method of claim 1, wherein the mobile application comprises a payment application, and wherein the update in the informational element includes at least one of a change to an account balance of the account based on the transaction or a transaction request associated with the transaction.

9. A user device comprising:
a non-transitory memory storing instructions; and
one or more hardware processors coupled to the non-transitory memory and configured to read the instructions from the non-transitory memory to cause the user device to perform operations comprising:

monitoring device data for a current usage of the user device and application data for a mobile application on the user device, wherein the mobile application provides access to an account associated with the application data;

determining, based on the device data and the application data, that the mobile application has an update to the application data that is presentable via a graphical user interface of the user device;

identifying a current usage of the mobile application on the user device when being used to process a transaction at a current location of the user device using the account;

determining that an informational element of the mobile application is configured to display the update via an application graphic on a home screen of an operating system of the user device, wherein the update causes information associated with the account and the current usage to be provided at the current location via the application graphic;

generating display data for the update in the information element based on the current location, the current usage for processing the transaction, and the application graphic; and displaying the display data via the application graphic on the home screen via the graphical user interface, wherein the displaying configures the application graphic to be updated with the update in the informational element.

10. The user device of claim 9, wherein, prior to the generating the display data, the operations further comprise:

determining additional data associated with the current usage of the user device, wherein the generating the display data is further based on the additional data.

11. The user device of claim 10, wherein the additional data comprises at least one of account information for the account utilized in the mobile application, transaction data for the transaction processed during the current usage, or a merchant associated with the current location.

12. The user device of claim 9, wherein the update comprises one of a change to a balance of the account, a debit to the account, or a credit to the account.

13. The user device of claim 9, wherein, prior to the determining that the mobile application has the update that is presentable, the operations further comprise:

selecting the informational element from a plurality of information elements for display via the application graphic based on at least one of the current usage or the current location of the user device.

14. The user device of claim 13, wherein the selecting the informational element is further based on an importance or a frequency of use of a corresponding portion of the mobile application associated with the informational element.

15. The user device of claim 9, wherein the display data is displayed with a plurality of additional informational elements that are scrolled through or presented at intervals with the application graphic.

16. The user device of claim 9, wherein the display data includes a change to the application graphic that includes one of a text, a number, or an additional graphic presented with the application graphic.

17. A non-transitory machine-readable medium having stored thereon machine-readable instructions executable to cause a machine to perform operations comprising:

identifying a current usage of a user device for processing a transaction by a mobile application on the user device at a current location of the user device, wherein the transaction is processed via the mobile application at the current location using an account;

identifying an informational element associated with application data capable of being presented via an application icon of a mobile application, wherein the application icon resides on a home screen interface of a user device that displays the informational element independent of the mobile application being opened;

determining an update to the application data that is presentable via the application icon in the informational element based on a current usage of the user device, wherein the update provides information associated with the account and the current usage at the current location;

generating display data for the update based at least on the current location and the current usage for processing the transaction; and displaying, based on the display data, the update via the informational element in the application icon simultaneously with one or more other icons presented on the home screen interface without requiring the mobile application to be opened.

18. The non-transitory machine-readable medium of claim 17, wherein the current usage of the user device is associated with a merchant associated with the transaction at the current location or a payment instrument associated with the transaction.

19. The non-transitory machine-readable medium of claim 17, wherein the identifying the informational element includes selecting the informational element from a plurality of informational elements based on an importance assigned to each of the plurality of informational elements.

20. The non-transitory machine-readable medium of claim 17, wherein the operations further comprise:

receiving a selection of the application icon while the update is displayed via the informational element; and opening the application icon to an application interface having the update to the application data based on the selection.

\* \* \* \* \*